Oct. 15, 1968  L. L. McNAIR  3,405,497

SUSPENSION DEVICE FOR CEILINGS AND FIXTURES

Filed Aug. 8, 1966

INVENTOR
Lloyd L. McNair

BY  Cecil L. Wood

ATTORNEY

United States Patent Office 3,405,497
Patented Oct. 15, 1968

3,405,497
SUSPENSION DEVICE FOR CEILINGS
AND FIXTURES
Lloyd L. McNair, Rte. 1, Box 278, De Soto, Tex. 75115
Filed Aug. 8, 1966, Ser. No. 570,841
2 Claims. (Cl. 52—699)

ABSTRACT OF THE DISCLOSURE

An anchor adapted to be imbedded in concrete roofs or ceilings for the suspension of false ceiling panels, or for supporting conduit, pipe, lighting fixtures, and the like, comprising a receptacle, preferably of a plastic material, open at its lower exposed end, and having a bolt concentrically thereof and extending through the closed end of the receptacle and secured thereto by nuts, one of which comprises an internally threaded coupling, the head of the bolt providing an anchorage for the receptacle when embedded in concrete.

---

This invention relates to anchoring devices for false ceiling panels, electrical conduits, service pipes, fixtures, and the like, when embedded in concrete roofs and ceilings, and has reference to subject matter disclosed in my Patent No. 2,957,279, dated Oct. 25, 1960.

A prime object of the invention resides in the provision of a suspension device by which various types of drop ceilings, electrical conduits, pipes, air ducts and fixtures can be supported, and providing a simple and easily installed medium by which such enumerated elements can be permanently and safely supported.

Another object is that of providing a rugged suspension device for installation in concrete roofs and ceilings capable of being readily adapted for various types of connecting media, such as extension rods, hooks, eyelets, and the like, by which the suspended items can be attached with the minimum of effort yet affording maximum effectiveness and durability.

Broadly, the invention contemplates the provision of an anchorage of the type described which is compact in structure and design, and capable of being economically produced.

Other and lesser objects will become apparent as the description proceeds, when considered in connection with the appended drawings wherein.

Figure 1:
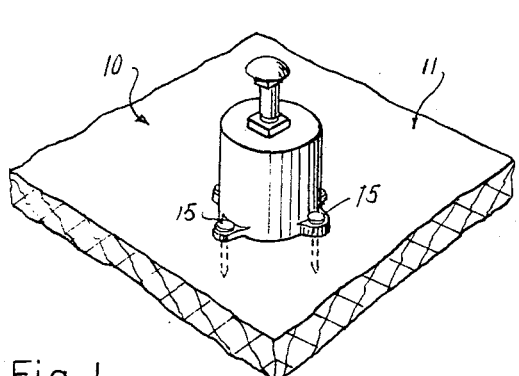
FIGURE 1 is a perspective view showing suspension means embodying the invention as applied to a wooden form, shown fragmentarily, preparatory to molding a concrete ceiling.
Figure 2:
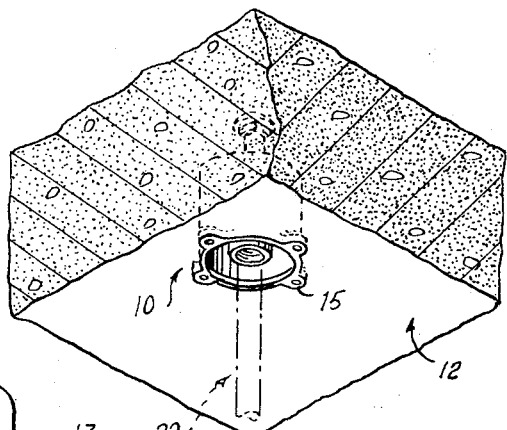
FIGURE 2 is a perspective view showing fragmentarily the finished ceiling with the suspension means of the invention embedded therein, the form having been removed.
Figure 3:
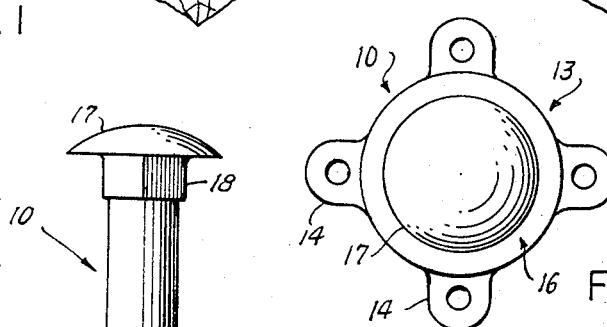
FIGURE 3 is a top plan view on an enlarged scale showing the device of the invention in its detached position.
Figure 5:
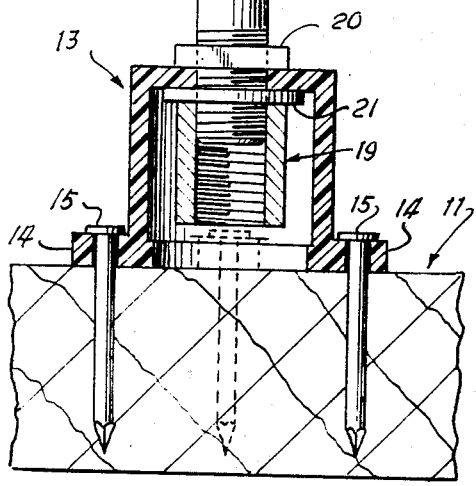
Figure 6:
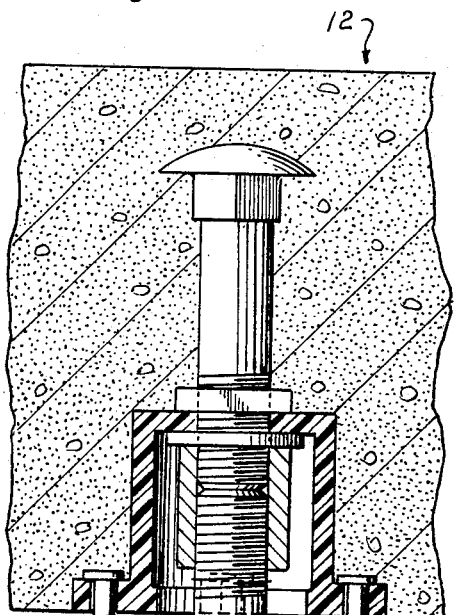
Figure 4:
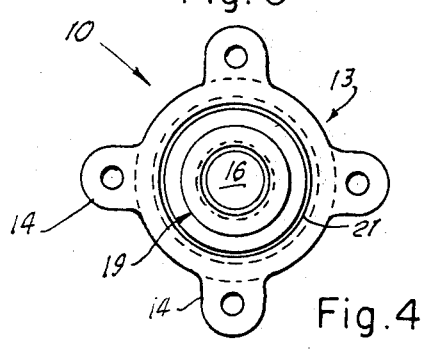
FIGURE 4 is a bottom plan view thereof.

FIGURE 5 is a sectional elevational view on an enlarged scale, taken on a median line, showing the suspension means of the invention and the form, substantially as illustrated in FIGURE 1, and FIGURE 6 is a sectional elevational view on an enlarged scale, taken on a median line, showing the suspension means of the invention embedded in the finished ceiling, the form having been removed, substantially as illustrated in FIGURE 2.

Referring primarily to FIGURES 1 and 5 of the drawing, the numeral 10 designates generally suspension means embodying the invention, which as shown is attached to the top side of a wooden form, shown fragmentarily and indicated generally by the numeral 11, preparatory to molding a concrete ceiling.

As shown in FIGURES 2 and 6, the suspension means 10 is embedded in the ceiling, shown fragmentarily and indicated generally by the numeral 12, as formed and, upon removal of the form 11, provides a downwardly facing receptacle as hereinafter described, flush with the surface of the finished ceiling 12, having support means therein for attachment of a depending rod, hanger wire, or other linkage for supporting a false or suspended ceiling, pipe or fitting from the ceiling 12.

The suspension means 10 includes an inverted cup 13, which is generally cylindrical and is formed of molded plastic material. As shown, the cup 13 has a plurality of circumferentially spaced lugs 14 extending radially outwardly from its lower peripheral edge for engagement, respectively, by corresponding nails 15, for attachment of the cup 13 to the form 11, as illustrated in FIGURES 1 and 5.

As shown in FIGURES 2 and 6, the nails 15 are cut off immediately below the ceiling 12 upon removal of the form 11 therefrom.

The suspension means 10 further includes a bolt 16 which has a large head 17, approaching the diameter of the cup 13, and has a polygonal shoulder 18 thereon immediately adjacent its head 17.

The bolt 16 is passed downwardly through a central opening therefor in the bottom of the cup 13. A short, internally threaded cylindrical member 19 is received on the lower, threaded end of the bolt 16, inside the cup 13. A lock nut 20 is threaded on the bolt 16, immediately above the cup 13, and a washer 21 is received on the bolt 16, between the cylindrical member 19 and the bottom of the cup 13.

The internally threaded cylindrical member 19, which as shown has one of its ends received on the threaded, lower end of the bolt 16 and extends downwardly below it, provides a convenient coupling for use in connecting thereto a threaded connecting member such as the depending rod 22, shown fragmentarily in FIGURE 6, whereby the rod 22 or other connecting member is adapted to be rigidly and positively connected to the cailing 12, by a threaded joint.

The invention may be modified within certain limitations by persons skilled in the art without departing from the spirit and intent thereof or the scope of the appended claims.

What is claimed is:

1. A suspension anchor for embodiment in concrete ceilings for suspending drop ceilings, conduits, pipes and fixtures therefrom, in combination, a cylindrical receptacle, open at one end, and having a plurality of spaced apertured lugs formed about and projecting radially from said open end, the closed end of said receptacle being planar and having an aperture centrally thereof, a bolt, having a head, arranged through the aperture in said closed end and having its threaded end partially enclosed in said receptacle, lock nuts on said bolt abutting both planar surfaces of the closed end of said receptacle, and an internally threaded sleeve threaded on said bolt internally of said receptacle for attaching a threaded suspension rod to said bolt.

2. In a suspension anchor as described in claim 1, the said apertured lugs providing means for attachment of said receptacle to a form for a concrete ceiling whereby the said open end of said receptacle is flush with the surface of said ceiling when the form is removed.

References Cited

UNITED STATES PATENTS

| 1,323,067 | 11/1919 | Keith | 52—699 |
| 1,145,385 | 7/1915 | Marble | 52—701 |
| 2,687,788 | 8/1954 | Rapp | 52—704 |
| 2,957,279 | 10/1960 | McNair | 52—706 XR |

FOREIGN PATENTS

| 591,036 | 8/1947 | Great Britain. |
| 909,298 | 10/1962 | Great Britain. |
| 1,333,580 | 6/1963 | France. |

BOBBY R. GAY, *Primary Examiner.*

A. M. CALVERT, *Assistant Examiner.*